United States Patent
Mulherkar et al.

(10) Patent No.: US 10,013,490 B1
(45) Date of Patent: Jul. 3, 2018

(54) APPLICATION SEARCH ENGINE

(71) Applicant: Amazon Technologies, Inc., Seattle, WA (US)

(72) Inventors: Mandar Mulherkar, Irvine, CA (US); Matthew Alan Jones, Ladera Ranch, CA (US); Sunbir Gill, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 403 days.

(21) Appl. No.: 14/657,009

(22) Filed: Mar. 13, 2015

(51) Int. Cl.
G06F 17/30 (2006.01)
H04L 29/08 (2006.01)

(52) U.S. Cl.
CPC ........ G06F 17/30864 (2013.01); H04L 67/06 (2013.01)

(58) Field of Classification Search
CPC ...... G06F 17/30864; G06F 8/60; H04W 4/00; G06Q 30/0631
See application file for complete search history.

(56) References Cited

U.S. PATENT DOCUMENTS

| | | | | |
|---|---|---|---|---|
| 2012/0084393 | A1* | 4/2012 | Williams | G06F 8/61 709/217 |
| 2012/0110174 | A1* | 5/2012 | Wootton | G06F 21/564 709/224 |
| 2012/0303476 | A1* | 11/2012 | Krzyzanowski | G06F 8/60 705/26.5 |
| 2013/0230178 | A1* | 9/2013 | Gates | G06Q 30/02 381/56 |
| 2013/0268397 | A1* | 10/2013 | Mehta | G06F 8/60 705/26.7 |
| 2013/0311238 | A1* | 11/2013 | Cheloff | G06Q 30/0206 705/7.35 |
| 2013/0346268 | A1* | 12/2013 | Pereira | G06Q 10/10 705/34 |
| 2015/0186533 | A1* | 7/2015 | Patil | G06F 17/30867 707/723 |

* cited by examiner

*Primary Examiner* — Jorge A Casanova
(74) *Attorney, Agent, or Firm* — Thomas | Horstemeyer, LLP

(57) ABSTRACT

Disclosed are various embodiments of a search engine for software applications. An application and first application metadata are received, and the application is scanned to identify second application metadata. The first and second application metadata are added to a search index corresponding to a plurality of applications offered via an application marketplace system. A search query is received, and a search of the search index is performed for the search query. One or more search results are generated from the search.

20 Claims, 6 Drawing Sheets

US 10,013,490 B1

APPLICATION SEARCH ENGINE

BACKGROUND

Computing applications are software programs that may be designed to help users perform a specific activity. Non-limiting examples of applications may include game applications, social networking applications, email applications, productivity applications, telephone applications, calendar applications, camera applications, mapping applications, and/or other types of applications. Applications that are designed to be executed on smartphones, tablets, and like mobile devices are often referred to as "mobile applications." Traditionally, applications were sold to users via physical media, such as floppy disks, compact discs (CDs), digital versatile discs (DVDs), and so on. In recent years, however, the trend has been to offer applications via application marketplaces, or virtual stores for applications. Application marketplaces may be accessed via a dedicated application or a browser-based interface. Application marketplaces may also facilitate installation of new applications and management of existing applications on a computing device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to a search engine for applications offered via an application marketplace. Application marketplaces may offer thousands of different applications for download, some for free and others for purchase. Even for a specific type of task, there may be hundreds of different applications directed to that task. Thus, it can be difficult for a user to locate an application of interest.

An application marketplace may organize applications according to a taxonomy. For example, applications may be organized into top-level categories such as "Books & Comics," "Communication," "Entertainment," "Games," and so on. A user may be able to drill down into a top-level category via subcategories to find applications of interest. While such browsing may be helpful, it may still be difficult to find a specific application given the large volume of applications that may be offered.

Accordingly, an application marketplace may offer a search engine feature. A user may enter a search query in an input field, and then a database of application information may be searched. A naïve approach may be to search simply the title and description for an application. However, an application marketplace may have significantly more information about applications than merely the title and description.

Various embodiments of the present disclosure provide a search engine for applications that considers additional data sources beyond merely a title and description. For example, developers may provide enhanced marketing data about their applications, and this enhanced marketing data may be indexed and searched as part of an application search. In some embodiments, the search engine may additionally perform a search within information about items that may be purchased within an application. These items may be surfaced in the application search results.

Figure 1:
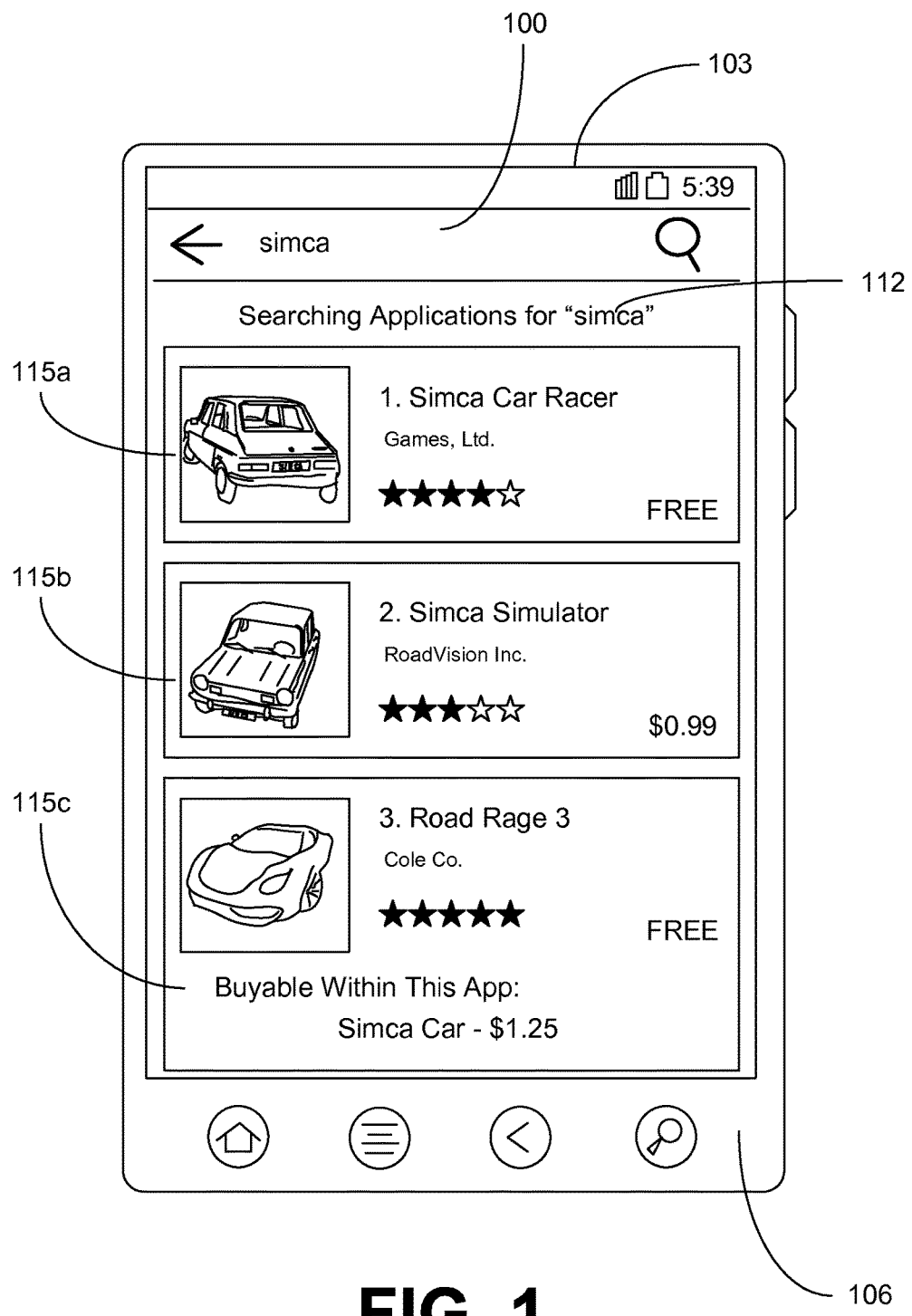
FIG. 1 is a pictorial diagram of an example user interface rendered by a client device according to various embodiments of the present disclosure.

Referring now to FIG. 1, shown is a pictorial diagram of an example user interface 100 rendered upon a display 103 of a client device 106 according to various embodiments. The user interface 100 corresponds to a search user interface rendered by an application marketplace search application executed in the client device 106. In this non-limiting example, a user has entered the search query 112 of "simca." In response, at least three search results 115 have been generated.

Each of the search results 115 may correspond to applications offered via an application marketplace system. Search result 115a corresponds to an application titled "Simca Car Racer." Search result 115b corresponds to an application titled "Simca Simulator." Finally, search result 115c corresponds to an application titled "Road Rage 3." Additional search results 115 may be accessible by swiping, scrolling, or performing other gestures.

It is noted that each of search results 115a and 115b contain the search query 112 in the title, but search result 115c does not. Search result 115c is selected because its application contains an in-application buyable item of "Simca Car." The in-application buyable item may be presented in the user interface 100 in conjunction with the search result 115c, and in some cases, may be purchased via the user interface 100. In the following discussion, a general description of the system and its components is provided, followed by a discussion of the operation of the same.

Figure 2:
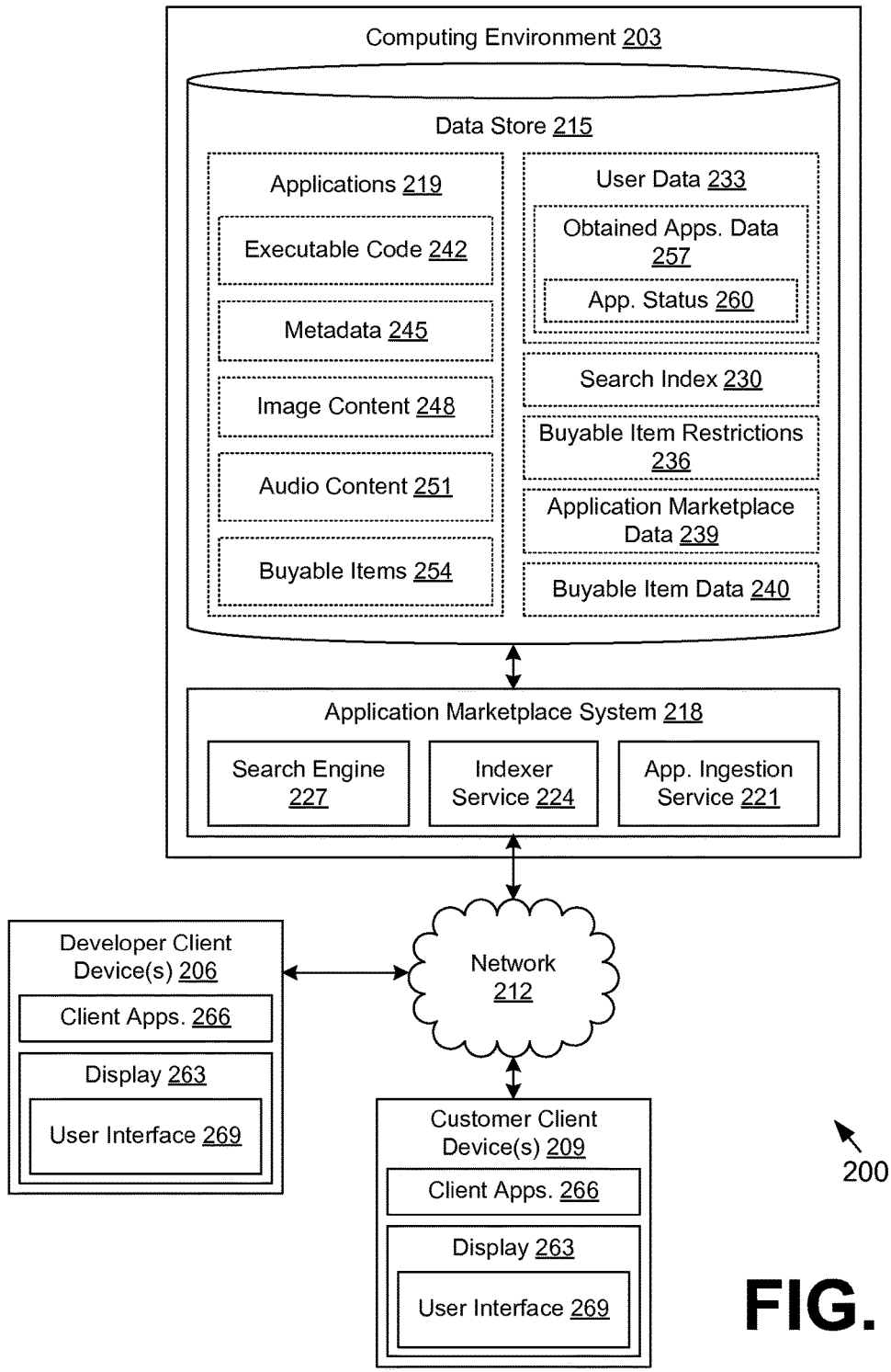
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more developer client devices 206, and one or more customer client devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include an application marketplace system 218 and other applications, services, processes, systems, engines, or functionality not discussed in detail herein. The application marketplace system 218 is executed to facilitate offering of software applications 219 electronically via the network 212. To this end, the application marketplace system 218 may be equipped to facilitate searching and browsing of a catalog of applications 219, purchasing applications 219, sending applications 219 via the network 212, and/or performing other functions.

For example, the application marketplace system 218 may include an application ingestion service 221, an indexer service 224, a search engine 227, and/or other components. The application ingestion service 221 may be executed to receive applications 219 from developer client devices 206 and perform processing to ready the applications 219 for inclusion in the application marketplace. The application ingestion service 221 may receive metadata directly from developers and/or may scan the applications 219 to determine metadata. The application ingestion service 221 may then provide the metadata to the indexer service 224.

The indexer service 224 is configured to receive metadata regarding applications 219 and to index the metadata in a search index 230. The search engine 227 is configured to receive search queries from customer client devices 209, perform searches of the search index 230 using the search queries, and to return search results to the customer client devices 209. The search engine 227 may rank the search results based upon relevance to the search query. The search engine 227 may utilize optimization techniques to exclude or rank lower those results that involve merely repeating certain keywords or other approaches to try to attain a higher relevance ranking than otherwise would be warranted. The search results may be returned to the customer client devices 209, for example, via an application programming interface (API) or via network pages. Customer selection of a search result may be configured to request additional information about the search result or initiate a purchase/download of the corresponding application 219.

The data stored in the data store 215 includes, for example, applications 219, user data 233, a search index 230, buyable item restrictions 236, application marketplace data 239, buyable item data 240, and potentially other data. The applications 219 correspond to software applications that may be offered via the application marketplace system 218 for installation upon the customer client devices 209. While some applications 219 may be offered free of charge, other applications 219 may be offered for purchase. The applications 219 may include, for example, WINDOWS applications, IOS applications, ANDROID applications, browser-based applications, and/or other applications.

Each application 219 may comprise, for example, executable code 242, metadata 245, image content 248, audio content 251, buyable items 254, and/or other data. The executable code 242 may comprise machine code executable by a processor, bytecode executable by a virtual machine, source code executable by an interpreter, and/or other types of code. In some cases, character strings may be embedded within the executable code 242. The metadata 245 may comprise various data about the application 219, including title, description, price, licensing information, and/or other information. Such information may be provided by a developer within the application 219 or may be provided during an application ingestion procedure of the application marketplace system 218.

The image content 248 may comprise static images, videos, and/or other graphical data used by the application 219. In some cases, character strings may be shown on images or videos in the image content 248. The audio content 251 may comprise music, sounds, narrations, and/or other audio used by the application 219.

Buyable items 254 comprise physical items or virtual items that are buyable or purchaseable through the application 219. The buyable items 254 may be buyable at any time through the application 219 or may depend on a user's status or achievements within the application 219. In one example, a free version of an application 219 may be associated with a buyable item 254 that corresponds to a full version of the application 219 that enables additional features of the application 219 upon purchase and activation. Such a professional version may be buyable at any time within the application 219. In another example, a game application 219 may offer a buyable item 254 corresponding to a weapon usable within the game. However, the weapon may be buyable only after the user reaches a certain level in the game, achieves a certain requirement with respect to gameplay, or achieves another predetermined status. The application 219 may facilitate purchasing the buyable item 254 via one or more API calls in the executable code 242.

The user data 233 may include a variety of data about users or customers of the application marketplace system 218. For example, the user data 233 may include contact information, billing information, browse history, purchase history, and/or other information. In addition, the user data 233 may include obtained applications data 257 about applications 219 that the user has purchased or otherwise obtained via the application marketplace system 218. The obtained applications data 257 may include an application status 260 for one or more of the applications 219. The application status 260 may indicate total time of use for the application 219, features accessed, levels visited, achievements earned, and/or other status information.

The search index 230 is a database that powers the search engine 227 for the application marketplace system 218. Specifically, the search index 230 contains data that facilitates searching for applications 219 offered by the application marketplace system 218. As will be described, the search index 230 may record various forms of metadata 245 about the applications 219, which may include enhanced marketing content supplied by developers, information gleaned from scanning the applications 219, buyable items 254 associated with the applications 219, and/or other data. The search index 230 may be optimized according to a variety of search engine optimization approaches. For example, search results that are selected more frequently in connection with certain queries may be given higher rankings. Thus, over time, more helpful results are surfaced earlier in the result lists.

The buyable item restrictions 236 may govern the purchaseability of a given buyable item 254. For example, a user may have to earn a certain status or achievement in an application 219 before the user is permitted to purchase a buyable item 254 via the application 219. The application marketplace data 239 includes information governing the offering of applications 219 via the application marketplace system 218. This information may include price, availability, customer reviews, popularity data, customer feedback, and so on. The buyable item data 240 includes data relating to buyable items 254. The information relating to the buyable item 254 may change over time for a given buyable item 254 (e.g., the price may increase), but the application 219 need not change. For example, the application 219 may include an application programming interface (API) call to the application marketplace system 218 in regard to an identifier of a buyable item 254, but the specific details about the buyable item 254 in the buyable item data 240 may change without needing to modify the application 219.

The developer client device 206 and the customer client device 209 are representative of a plurality of client devices that may be coupled to the network 212. Each developer client device 206 and customer client device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices. Each developer client device 206 and customer client device 209 may include a display 263. The display 263 may comprise, for example, one or more devices such as liquid crystal displays (LCD), gas plasma-based flat panel displays, organic light emitting diode (OLED) displays, electrophoretic ink (E ink) displays, LCD projectors, or other types of display devices, etc.

Each developer client device 206 and customer client device 209 may be configured to execute various applications such as client applications 266 and/or other applications. The client applications 266 may be executed in a developer client device 206 or a customer client device 209, for example, to access network content served up by the computing environment 203 and/or other servers, thereby rendering a user interface 269 on the display 263. To this end, the client application 266 may comprise, for example, a browser, a dedicated application, etc., and the user interface 269 may comprise a network page, an application screen, etc. With respect to the customer client device 209, the client applications 266 may include one or more applications 219 obtained from the application marketplace system 218. With respect to the developer client device 206, the client applications 266 may include an application or browser that facilitates the transfer of an application 219 to the application marketplace system 218 and/or the entry of metadata 245. The developer client device 206 and customer client device 209 may be configured to execute applications beyond the client applications 266 such as, for example, email applications, social networking applications, word processors, spreadsheets, and/or other applications.

Next, a general description of the operation of the various components of the networked environment 200 is provided. To begin, developers establish accounts with the application marketplace system 218 and send their applications 219 to the application marketplace system 218 for inclusion in the application marketplace. The applications 219 are received and processed by way of the application ingestion service 221 of the application marketplace system 218. In this regard, the application ingestion service 221 may be responsible for processing the inbound applications 219 and inserting offerings in the application marketplace.

The indexer service 224 is executed to update the search index 230 for the application marketplace with various metadata 245 that may be supplied by the developer and/or obtained by automated scans of the application 219 and accompanying files.

The search engine 227 is executed to perform searches of the search index 230 and to return search results to the customers at the customer client devices 209. It is noted that the search results may correspond to applications 219 offered via the application marketplace as well as buyable items 254 whose purchase is facilitated by the application marketplace system 218 through the application 219. The customers may then browse the search results and decide to order or purchase various applications 219 or buyable items 254 listed in the search results.

Figure 3:
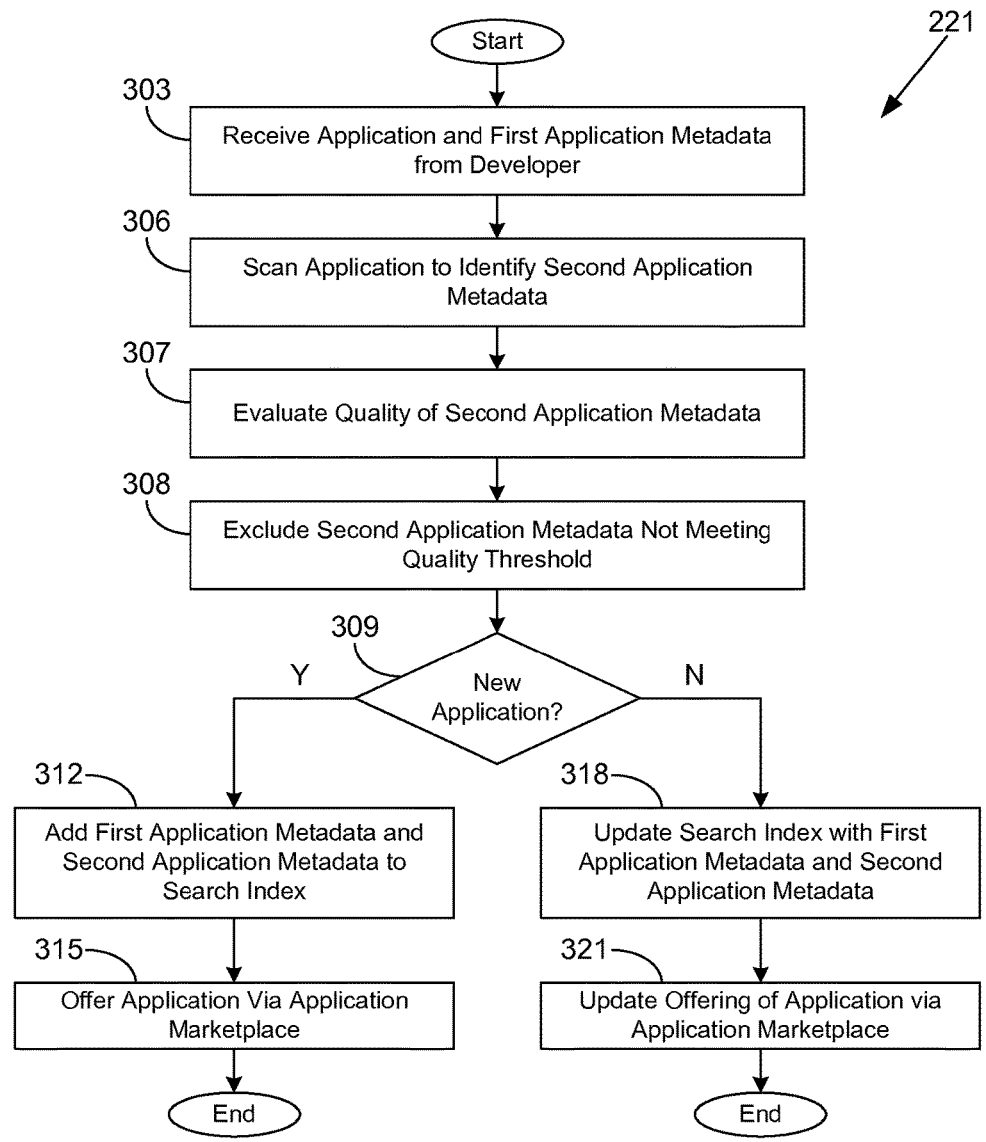
FIGS. 3 and 4 are flowcharts illustrating examples of functionality implemented as portions of an application ingestion service executed in a computing environment in the networked environment of FIG. 2 according to various embodiments of the present disclosure.

Turning now to FIG. 3, shown is a flowchart that provides one example of the operation of a portion of the application ingestion service 221 according to various embodiments. It is understood that the flowchart of FIG. 3 provides merely an example of the many different types of functional arrangements that may be employed to implement the operation of the portion of the application ingestion service 221 as described herein. As an alternative, the flowchart of FIG. 3 may be viewed as depicting an example of elements of a method implemented in the computing environment 203 (FIG. 2) according to one or more embodiments.

Beginning with box 303, the application ingestion service 221 receives an application 219 (FIG. 2) along with metadata 245 (FIG. 2) from a developer at a developer client device 206 (FIG. 2). For example, a developer user may access a network page generated by the application ingestion service 221 and may upload the application 219 and the metadata 245 via a browser. The application 219 may be bundled with executable code 242 (FIG. 2), metadata 245, image content 248 (FIG. 2), audio content 251 (FIG. 2), and/or other data. The developer user may supply enhanced marketing content and other metadata 245 via an online form. The developer may establish a title, description, price, etc. for the application 219, as well as buyable item restrictions 236 (FIG. 2). The enhanced marketing content may include images, animations, product comparison matrices, frequently asked questions, product tours, product video walkthroughs, and/or other content. The developer may submit the application 219 via other approaches, including uploading via file transfer protocol (FTP), emailing as an attachment, bulk scheduled transfer, and so on.

In box 306, the application ingestion service 221 scans the application 219 to identify additional metadata 245. An example of the scanning procedure will be discussed in more detail in connection with the flowchart of FIG. 4.

In box 307, the application ingestion service 221 evaluates the quality of the additional metadata 245. In scanning executable code 242 (FIG. 2) and/or other resources of the application 219, much low quality data may be identified. Such data may relate to programming details, library calls, and/or other aspects that are not of interest to an end user. The application ingestion service 221 may compare the identified additional metadata 245 to indexes of low quality data and/or may perform other analysis to evaluate the quality. For example, a machine learning approach may be used to exclude types of data that, over time, tends not to lead to user selections in presented search results. In box 308, the application ingestion service 221 excludes identified additional metadata 245 that does not meet a quality threshold.

In box 309, the application ingestion service 221 determines whether the application 219 that has been received corresponds to a new application 219 or an update to an existing application 219. If the received application 219 is a new application 219, the application ingestion service 221 continues to box 312. In box 312, the application ingestion service 221 adds the metadata 245 provided by the developer and the metadata 245 identified via the scan in box 306 to the search index 230 (FIG. 2). The search index 230 is used by the search engine 227 (FIG. 2) to perform a search of the applications 219 offered by the application marketplace system 218.

In box 315, the application ingestion service 221 offers the application 219 through the application marketplace system 218 according to parameters established by the developer. The application 219 may be offered as a free download or in response to payment of a purchase or rental fee. Thereafter, the operation of the application ingestion service 221 ends.

Otherwise, if the application 219 is an update to an existing application 219, the application ingestion service 221 moves from box 309 to box 318. In box 318, the application ingestion service 221 updates the search index 230 with the metadata 245 provided by the developer and the metadata 245 identified via the scan in box 306. It is noted that this updating may remove data that is no longer applicable from the search index 230 as well as add new data to the search index 230. In box 321, the application ingestion service 221 updates the offering of the application 219 via the application marketplace system 218. Thereafter, the operation of the portion of the application ingestion service 221 ends.

Figure 4:
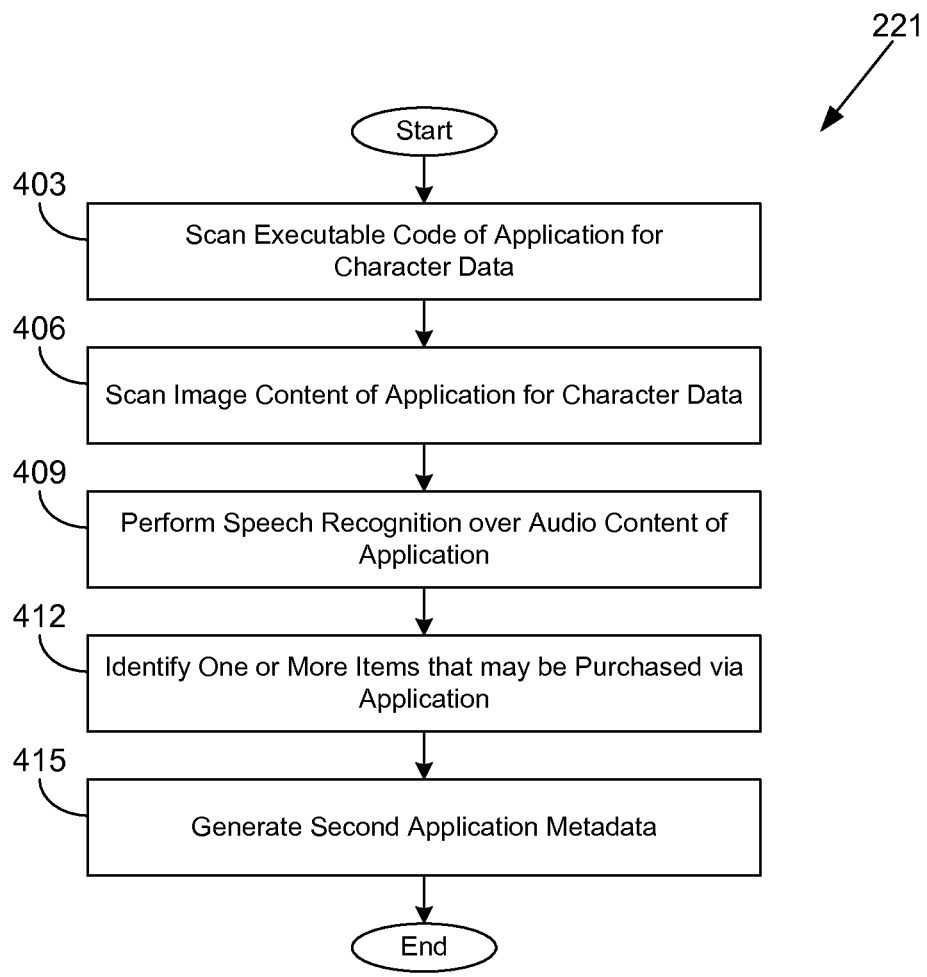

Moving on to FIG. 4, shown is a flowchart that provides one example of the operation of another portion of the application ingestion service 221 according to various embodiments. Specifically, FIG. 4 expands upon box 306 of FIG. 3 and describes further details of scanning the application 219 (FIG. 2) to identify metadata 245 (FIG. 2). It is understood that the flowchart of FIG. 4 provides merely an example of the many different types of functional arrangements that may be employed to implement the operation of the portion of the application ingestion service 221 as described herein. As an alternative, the flowchart of FIG. 4 may be viewed as depicting an example of elements of a method implemented in the computing environment 203 (FIG. 2) according to one or more embodiments.

Beginning with box 403, the application ingestion service 221 scans the executable code 242 (FIG. 2) of the application 219 for character data. For example, the executable code 242 may contain various strings that are presented in user interfaces 269 for status indications, instructions, dialog boxes, labels, and so on. In box 406, the application ingestion service 221 scans the image content 248 (FIG. 2) of the application 219 for character data. In this regard, images and videos used by the application 219 may contain character strings for explanation and information. In box 409, the application ingestion service 221 performs speech recognition over the audio content 251 (FIG. 2) of the application 219. Various applications 219 may include audio content 251 corresponding to narrations or other speech content.

In box 412, the application ingestion service 221 identifies one or more buyable items 254 (FIG. 2) that may be purchased or otherwise obtained via the application 219. For example, the application ingestion service 221 may determine that the application 219 calls a particular application programming interface (API) to link to another buyable item 254 in the application marketplace system 218. The linkage may include an item identifier, title, price, description, and/or other data that identifies the buyable item 254.

In box 415, the application ingestion service 221 generates metadata 245 resulting from the above operations. The metadata 245 may then be stored in the data store 215 (FIG. 2). Accordingly, the text extracted from the executable code 242, the image content 248, and the audio content 251 may be made searchable via the search engine 227 (FIG. 2) to identify applications 219 of interest. Further, the buyable items 254 may be made searchable via the search engine 227 in connection with the application 219. Thereafter, the portion of the application ingestion service 221 ends.

Figure 5:
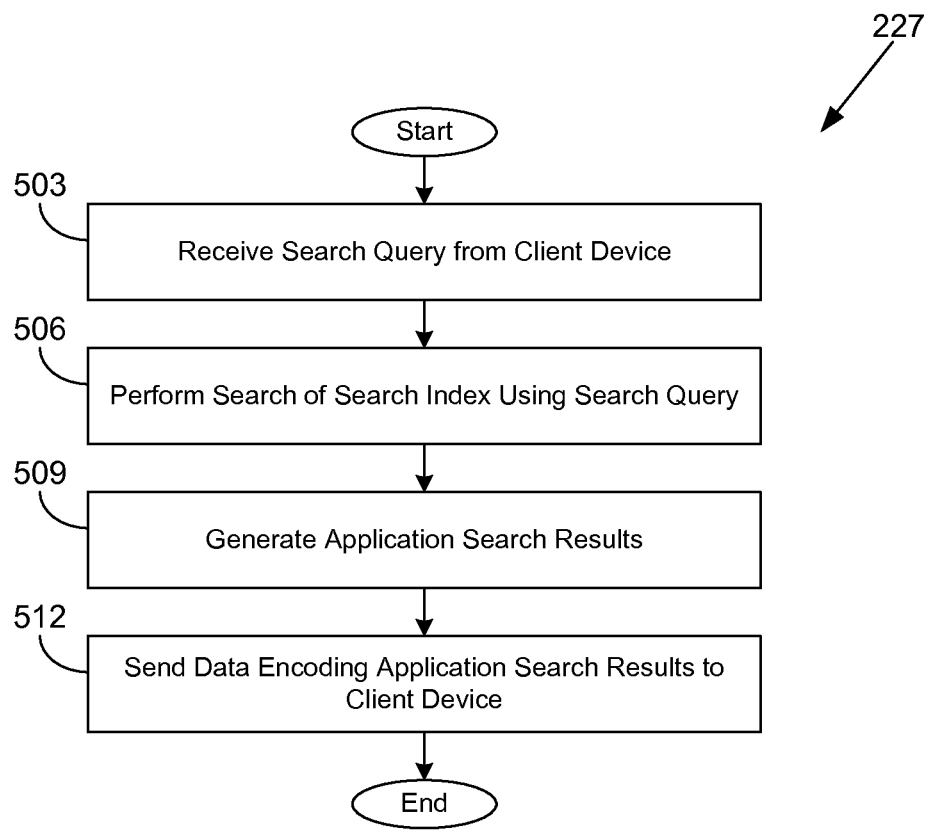
FIG. 5 is a flowchart illustrating one example of functionality implemented as portions of a search engine executed in a computing environment in the networked environment of FIG. 2 according to various embodiments of the present disclosure.

Referring next to FIG. 5, shown is a flowchart that provides one example of the operation of a portion of the search engine 227 according to various embodiments. It is understood that the flowchart of FIG. 5 provides merely an example of the many different types of functional arrangements that may be employed to implement the operation of the portion of the search engine 227 as described herein. As an alternative, the flowchart of FIG. 5 may be viewed as depicting an example of elements of a method implemented in the computing environment 203 (FIG. 2) according to one or more embodiments.

Beginning with box 503, the search engine 227 receives a search query from a customer client device 209 (FIG. 2). For example, the user may enter the search query via a form field in a network page, or the user may enter the search query via a dedicated client application 266 (FIG. 2) associated with the application marketplace system 218 (FIG. 2). In box 506, the search engine 227 performs a search of the search index 230 (FIG. 2) using the search query.

In box 509, the search engine 227 generates one or more application search results corresponding to the results of the search performed in box 506. The applications 219 (FIG. 2) in the application search results may be matched to the search query via title, description, and/or other metadata 245 (FIG. 2). The applications 219 may be matched to the search query based at least in part on enhanced marketing content and buyable items 254 (FIG. 2). For example, the title or description of the buyable item 254 may match the search query, and the buyable item 254 may be surfaced in connection with the application 219 in which it is buyable.

Where buyable items 254 are selected for inclusion in the application search results, the buyable items 254 may be filtered or selected based at least in part on the buyable item restrictions 236 (FIG. 2) as compared to the application status 260 (FIG. 2) and/or other user data 233 (FIG. 2). For example, the buyable items 254 may be featured in the search results if the customer owns the corresponding application 219 in which the item is buyable. Alternatively, the buyable items 254 may be featured in the search results if the customer qualifies to obtain the buyable item 254 according to the application status 260. In some cases, the ranking of the buyable item 254 in the search results may depend on one or more of these factors.

Further, In box 512, the search engine 227 sends data encoding the application search results to the customer client device 209 via the network 212 (FIG. 2). The application search results may be rendered in one or more network pages or other user interfaces 269 (FIG. 2). The user interfaces 269 may facilitate ordering the corresponding applications 219 and/or buyable items 254 in the search results and/or viewing additional detailed information. Thereafter, the portion of the search engine 227 ends.

Figure 6:
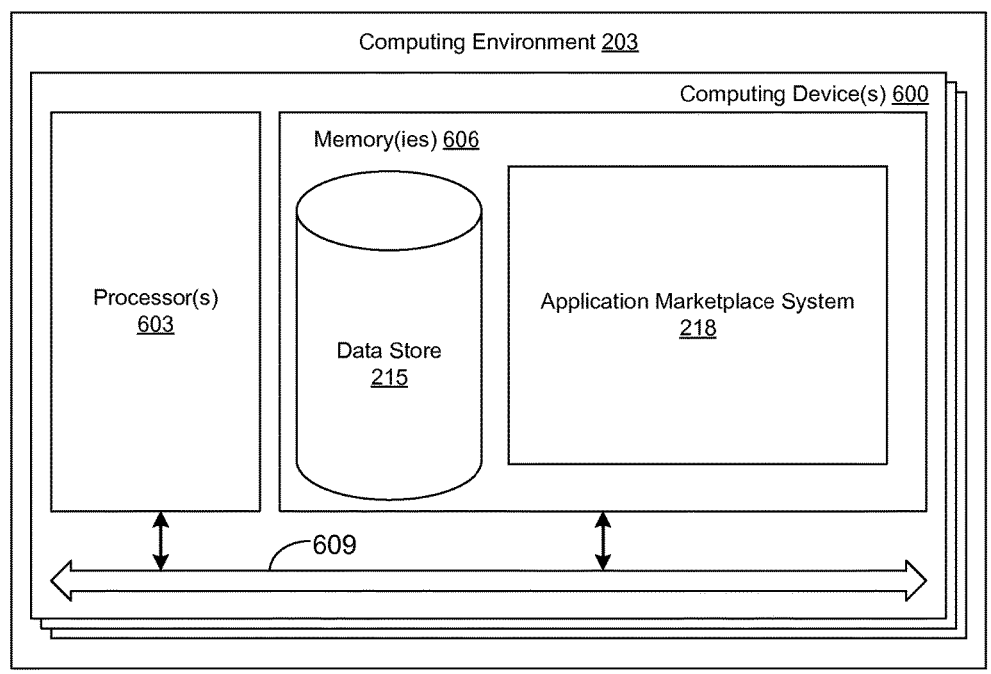
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the application marketplace system 218 and potentially other applications. Also stored in the memory 606 may be a data store 215 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the application marketplace system 218 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the application marketplace system 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application marketplace system 218, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the application marketplace system 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
receive a particular application from a first client device;
identify a virtual item that may be purchased through the particular application based at least in part on an application programming interface (API) call in the particular application;
generate metadata corresponding to the particular application based at least in part on a scan of the particular application;
add the metadata corresponding to the particular application to a search index that corresponds to a plurality of applications offered by an application marketplace;
add metadata corresponding to the virtual item to the search index in association with the particular application;
receive a search query from a second client device;
perform a search of the search index using the search query; and
generate a plurality of application search results in response to the search, at least one of the plurality of application search results being selected based at least in part on a comparison of the search query to the metadata corresponding to the virtual item.

2. The non-transitory computer-readable medium of claim 1, wherein generating the plurality of search results further comprises determining that the second client device is associated with a status in the particular application that enables the second client to purchase the virtual item.

3. The non-transitory computer-readable medium of claim 1, wherein the scan of the particular application further comprises a scan of at least one of: executable code of the particular application, image content of the particular application, or audio content of the particular application.

4. A system, comprising:
at least one computing device; and
an application marketplace system executable in the at least one computing device, wherein when executed the application marketplace system causes the at least one computing device to at least:
in response to receiving an application and first application metadata, scan the application to identify second application metadata;
add the first application metadata and the second application metadata to a search index corresponding to a plurality of applications offered via the application marketplace system;
in response to receiving a search query, perform a search of the search index for the search query; and
generate at least one search result from the search.

5. The system of claim 4, wherein the at least one search result includes the application.

6. The system of claim 4, wherein the second application metadata excludes a title of the application.

7. The system of claim 4, wherein when executed the application marketplace system further causes the at least one computing device to at least receive the application and the first application metadata from a client device.

8. The system of claim 7, wherein the first application metadata includes a title of the application and a description of the application.

9. The system of claim 4, wherein scanning the application further comprises scanning executable code of the application for character data.

10. The system of claim 4, wherein scanning the application further comprises scanning image content of the application for character data.

11. The system of claim 4, wherein scanning the application further comprises performing speech recognition over audio content of the application.

12. The system of claim 4, wherein scanning the application further comprises identifying at least one item that may be purchased via the application.

13. The system of claim 12, wherein scanning the application further comprises identifying at least one item that may be purchased via the application based at least in part on an application programming interface (API) call within the application.

14. A method, comprising:
- identifying, via at least one computing device, an item that may be purchased through a particular application of a plurality of applications based at least in part on an application programming interface (API) call in the particular application;
- adding, via the at least one computing device, metadata corresponding to the item to a search index in association with the particular application, the search index corresponding to the plurality of applications being offered by an application marketplace;
- receiving, via the at least one computing device, a search query from a client device;
- performing, via the at least one computing device, a search of the search index using the search query; and
- generating, via the at least one computing device, a plurality of application search results in response to the search, at least one of the plurality of application search results being selected based at least in part on a comparison of the search query to the metadata corresponding to the item that may be purchased through the particular application.

15. The method of claim 14, wherein the item is a virtual item usable within the particular application.

16. The method of claim 14, further comprising receiving, via the at least one computing device, the particular application from a developer client device.

17. The method of claim 14, further comprising:
- identifying, via the at least one computing device, an account associated with the client device; and
- selecting, via the at least one computing device, the at least one of the plurality of application search results based at least in part on determining that the account is configured to purchase the item.

18. The method of claim 17, wherein selecting the at least one of the plurality of application search results further comprises ranking, via the at least one computing device, the at least one of the plurality of application search results based at least in part on determining that the account is configured to purchase the item.

19. The method of claim 17, wherein determining that the account is configured to purchase the item further comprises determining, via the at least one computing device, that the account has obtained the particular application.

20. The method of claim 19, wherein determining that the account is configured to purchase the item further comprises determining, via the at least one computing device, that the account is associated with a status in the particular application that enables the account to purchase the item.

* * * * *